United States Patent
Roohparvar et al.

(10) Patent No.: US 6,633,494 B2
(45) Date of Patent: Oct. 14, 2003

(54) LOW VOLTAGE CHARGE PUMP EMPLOYING DISTRIBUTED CHARGE BOOSTING

(75) Inventors: Bob Roohparvar, San Jose, CA (US); Kevin Z. Mahouti, Sunnyvale, CA (US); Karl Rapp, Los Gatos, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 123 days.

(21) Appl. No.: 10/004,319

(22) Filed: Oct. 25, 2001

(65) Prior Publication Data

US 2002/0041503 A1 Apr. 11, 2002

Related U.S. Application Data

(63) Continuation of application No. 09/662,207, filed on Sep. 14, 2001, now Pat. No. 6,385,065.

(51) Int. Cl.[7] ............................. H02M 3/18; H02M 7/42
(52) U.S. Cl. .............................. 363/60; 327/536
(58) Field of Search ........................... 363/60, 58, 49, 363/50, 41, 34, 61, 37; 307/594, 450, 482; 327/594, 458, 536, 328

(56) References Cited

U.S. PATENT DOCUMENTS

| | | | |
|---|---|---|---|
| 4,500,799 A | | 2/1985 | Sud et al. ............... 307/449 |
| 5,142,238 A | * | 8/1992 | White ..................... 330/9 |
| 5,280,420 A | * | 1/1994 | Rapp ..................... 363/60 |
| 5,432,469 A | * | 7/1995 | Tedrow et al. ............ 327/306 |
| 5,436,587 A | * | 7/1995 | Cernea ................... 327/536 |
| 5,592,115 A | * | 1/1997 | Kassapian ................ 327/239 |
| 5,831,469 A | * | 11/1998 | Menichelli ............... 327/536 |
| 5,943,226 A | * | 8/1999 | Kim ...................... 363/60 |
| 5,973,979 A | | 10/1999 | Chang et al. ............. 365/226 |
| 6,028,780 A | * | 2/2000 | Chang .................... 363/60 |

OTHER PUBLICATIONS

U.S. patent application Ser. No. 09/662,207, Roohparvar et al., filed Sep. 14, 2000.
U.S. patent application Ser. No. 09/661,485, Roohparvar, et al., filed Sep. 14, 2000.

* cited by examiner

*Primary Examiner*—Rajnikant B. Patel
(74) *Attorney, Agent, or Firm*—Skjerven Morrill LLP; Philip W. Woo; N. R. H. Black

(57) ABSTRACT

A charge pump system, including a charge pump and associated distributed clock generation circuitry, is provided for generating high voltages from a low initial voltage in applications such as erasing and programming electrically erasable programmable read only memory (EEPROM) arrays. The charge pump system uses a power supply voltage and a clock and includes a first phase bootstrapping circuit, an inverter, and a second phase bootstrapping circuit, and a two-stage charge pump. The two phase bootstrapping circuits are both responsive to the clock and use a distributed bootstrapping scheme to provide first and second phase clock signals with fixed multiples of the power supply voltage in order to overcome increased effective transistor threshold voltages, increase efficiency, and allow for charge boosting in a limited number of stages. The inverter is connected to the second phase bootstrapping circuit, causing the second phase clock signal to be opposite in phase from the first clock signal. The two-stage charge pump is responsive to the power supply voltage and the first and second phase clocks and uses native transistors that have lower threshold voltages. A high voltage is produced from the two-stage charge pump by alternately adding charge to the power supply voltage in each cycle of the first and second phase clock signals.

14 Claims, 4 Drawing Sheets

LOW VOLTAGE CHARGE PUMP EMPLOYING DISTRIBUTED CHARGE BOOSTING

CROSS-REFERENCE TO RELATED APPLICATIONS

The present application is a continuation application of U.S. patent application Ser. No. 09/662,207, filed on Sep. 14, 2000, now U.S. Pat. No. 6,385,065 entitled "Low Voltage Charge Pump Employing Distributed Charge Boosting." The present application is related to U.S. patent application Ser. No. 09/661,485, filed on Sep. 14, 2000, entitled "Low Voltage Charge Pump Employing Optimized Clock Amplitudes," and U.S. patent application Ser. No. 09/661,485 filed concurrently herewith, entitled "Low Voltage Charge Pump Employing Optimized Clock Amplitudes."

TECHNICAL FIELD

The present invention relates generally to charge pumps and more particularly to charge pumps that operate at low voltages by utilizing distributed charge boosting.

BACKGROUND

The popularity of portable electronic devices has substantially increased demand for smaller, lighter, longer lasting portable devices. Thus, a major trend in the manufacture of laptop computers, cell phones, and other portable, battery-powered devices is toward a reduction in the voltage levels required to operate the integrated circuits which are used in the various components of those devices.

In order to reduce power consumption and extend battery life, much of the integrated circuitry used in portable devices is being designed to run at low voltage levels. This reduces the power usage and reduces the heat generated by the circuit components allowing more components to be placed closer to one another. The circuitry and components used in portable computers typically are being designed to operate at voltages levels substantially less than the previous standard of 5V, with 1.0V and lower becoming increasingly common.

However, the desire to not compromise the number and quality of features in portable devices as compared to their non-portable counterparts has led to an increase in the number of circuits used, thus requiring more power. These circuits still require higher voltages to function properly.

An example of a function that requires higher voltages relates to the basic input/output system (BIOS) information of a computer. As improvements in a computer or its peripherals are developed, the BIOS information typically stored in a read only memory (ROM) device or similar circuit providing a non-volatile read only memory needs to be updated. Historically, such changes had to be accomplished by physically removing the ROM and replacing the old circuit with an entirely new circuit having the new BIOS information. The expense and the considerable complexity involved in such procedures made this undesirable for normal computer users.

More recently, electrically erasable programmable read only memory (EEPROM) has been used to store BIOS information. This type of non-volatile memory device can be reprogrammed by running a small update program without removing the circuitry from the computer. Running the update program to reprogram the EEPROM requires approximately 12–16 V for erasing and writing operations. The voltages provided in the batteries of portable computers must be boosted for such operations.

Another example involves Flash EEPROM devices arranged in large arrays to mimic hard disk drives. Flash EEPROM arrays provide a smaller and lighter functional equivalent of a hard disk drive which operates more rapidly and is less sensitive to physical damage. Such memory arrays are especially useful in portable computers where space is at a premium and weight is extremely important. However, Flash EEPROM arrays also require much higher voltages for writing and erasing data than can be provided directly by the batteries of most portable computers and it is necessary to generate voltages greater than the device supply voltage and/or voltages more negative than ground.

In such instances, where the lower voltage batteries being employed in portable electronic devices are unable to provide a sufficiently high voltage to operate a device or certain circuitry by itself, a "charge pump" or "bucket brigade" circuit has typically been used to generate a higher voltage from the available lower voltage. Such circuits shift electrical charge along a series of diode-connected transistors stages that are driven by capacitively coupled clock drivers, typically two-phase clocks, to boost voltage. The source of the charge, a low voltage battery for example, introduces the charge at one end of the pump and it is shifted along and its voltage is increased until the desired voltage is reached at the output.

A major problem is that conventional charge pumps have difficulty dealing with the lower battery voltages being used. In particular, the MOS transistors used in the charge pumps have switching threshold voltages that are a large fraction of the supply voltage. The problem is related to the fact that diode-connected transistors develop increasing back-bias between the source and the body of the transistor as the voltage increases along the length of the pump. The result of this back-bias (also known as the "source-body effect", "M factor", or "body effect") is to increase the effective threshold of the transistor, in some higher voltage cases almost doubling it. With increased effective transistor thresholds and decreased supply voltages, the charge pump transistors would no longer switch properly and the charge pump would not work.

Many designs used a technique called "bootstrapping" to generate higher amplitude clock signals to compensate for the increased effective threshold voltages relative to the supply voltage. The bootstrapping technique involves the use of a charge capacitor that charges on every clock pulse and discharges between pulses, adding the discharged voltage to the original input voltage of the bootstrapping circuit so the output could be multiplied to a number of times the original input. Applying a uniform high clock voltage, generated by bootstrapping, leads to energy inefficiency because the greater the current delivered by the clocking voltage, the less efficient the bootstrapping operation. In the latter stages where high voltages are required, this inefficiency was unavoidable. In the initial stages of the charge pump, where as high a voltage is not needed, the clock bootstrapping operation was inefficient.

In general, currently available charge pumps are inefficient, large, and complex. They do not properly deal with low initial supply voltages and fail to address the problems inherent with higher threshold voltages caused by the body effect. A solution, which would provide a simple charge pump with efficient operation using a low initial supply voltage, has long been sought but has eluded those skilled in the art. As the popularity grows of portable battery-powered devices in which such a design could be particularly useful, it is becoming more pressing that a solution be found.

DISCLOSURE OF THE INVENTION

The present invention provides a charge pump system, including a charge pump and associated distributed clock generation circuitry, for generating high voltages from a low initial voltage in applications such as erasing and programming electrically erasable programmable read only memory (EEPROM) arrays. The charge pump system uses a power supply voltage and a clock and includes a first phase bootstrapping circuit, an inverter, and a second phase bootstrapping circuit, and a two-stage charge pump. The two bootstrapping circuits are both responsive to the clock and use a distributed bootstrapping scheme to provide first and second phase clock signals with fixed multiples of the power supply voltage in order to overcome increased transistor threshold voltages, increase efficiency, and allow for charge boosting in a limited number of stages. The inverter is connected to the second phase bootstrapping circuit, causing the second phase clock signal to be opposite in phase from the first phase clock signal. The two-stage charge pump is responsive to the power supply voltage and the first and second phase clock signals. A high voltage is produced from the two-stage charge pump by alternately adding charge to the power supply voltage in each cycle of the first and second phase clock signals.

The present invention furthermore provides a charge pump system in which the first and second phase bootstrapping circuits provide high amplitude clock signals in order to overcome transistor threshold voltages increased due to the body effect. This allows for optimized clock signals and results in quick and efficient operation.

The present invention furthermore provides a charge pump system wherein native transistors are used for a decreased transistor threshold voltage. Such a lowered threshold voltage aids the circuit in operating with lower initial voltages.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
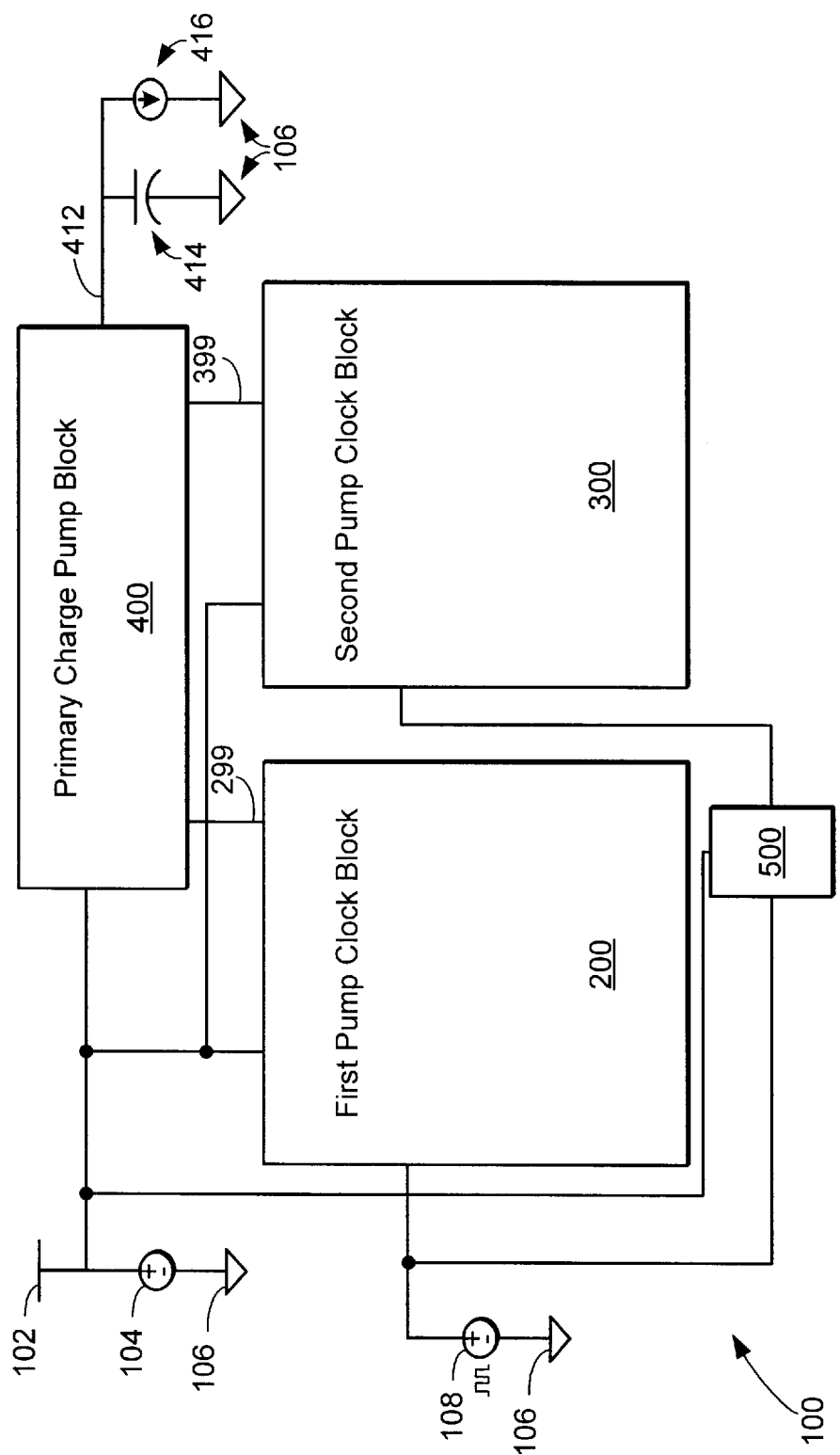
FIG. 1 is a block diagram of the charge pump and its associated variable-amplitude clock signal generation circuitry of the present invention.

Referring now to FIG. 1, therein is shown a block diagram of a charge pump system 100 including a primary charge pump block 400 and its associated variable-amplitude clock signal generation circuitry of the present invention. The charge pump system 100 is powered by a power source 104, which provides a power supply voltage Vdd 102 and ground 106. The charge pump system 100 uses an oscillating clock 108 with an initial amplitude of the power supply voltage Vdd 102.

There are four blocks: the primary charge pump block 400, an inverting block 500, a first pump clock block 200, and a second pump clock block 300. Each block is connected to the power supply voltage Vdd 102, and the first pump clock block 200 and the inverter block 500 are connected to the clock 108. Both the first and second pump clock blocks 200 and 300 are connected to the primary charge pump block 400. The inverting block 500 is connected to the second pump clock block 300. The first and second pump clocks 200 and 300 are identical in structure and operation. Because their input signals differ only in phase due to the inverter block 500, their respective output signals 299 and 399 also differ only in phase.

In operation referring to FIG. 1, the inverting block 500 inverts the signal of the clock 108 and outputs an inverted clock signal to the second pump clock block 300. The first and second pump clock blocks 200 and 300 produce pump clock outputs 299 and 399 which are opposite in phase and connect to the primary charge pump block 400. The primary charge pump block 400 starts with the power supply voltage Vdd 102 and shifts charge through two charge pump stages controlled by the opposite phase pump clock outputs 299 and 399. The result is a high voltage at a primary charge pump block output 412. The primary charge pump block output 412 is connected to ground 106 by a load capacitor CL1 414 and a current load 416 in order to simulate a generic load on the charge pump system 100.

Figure 2A:
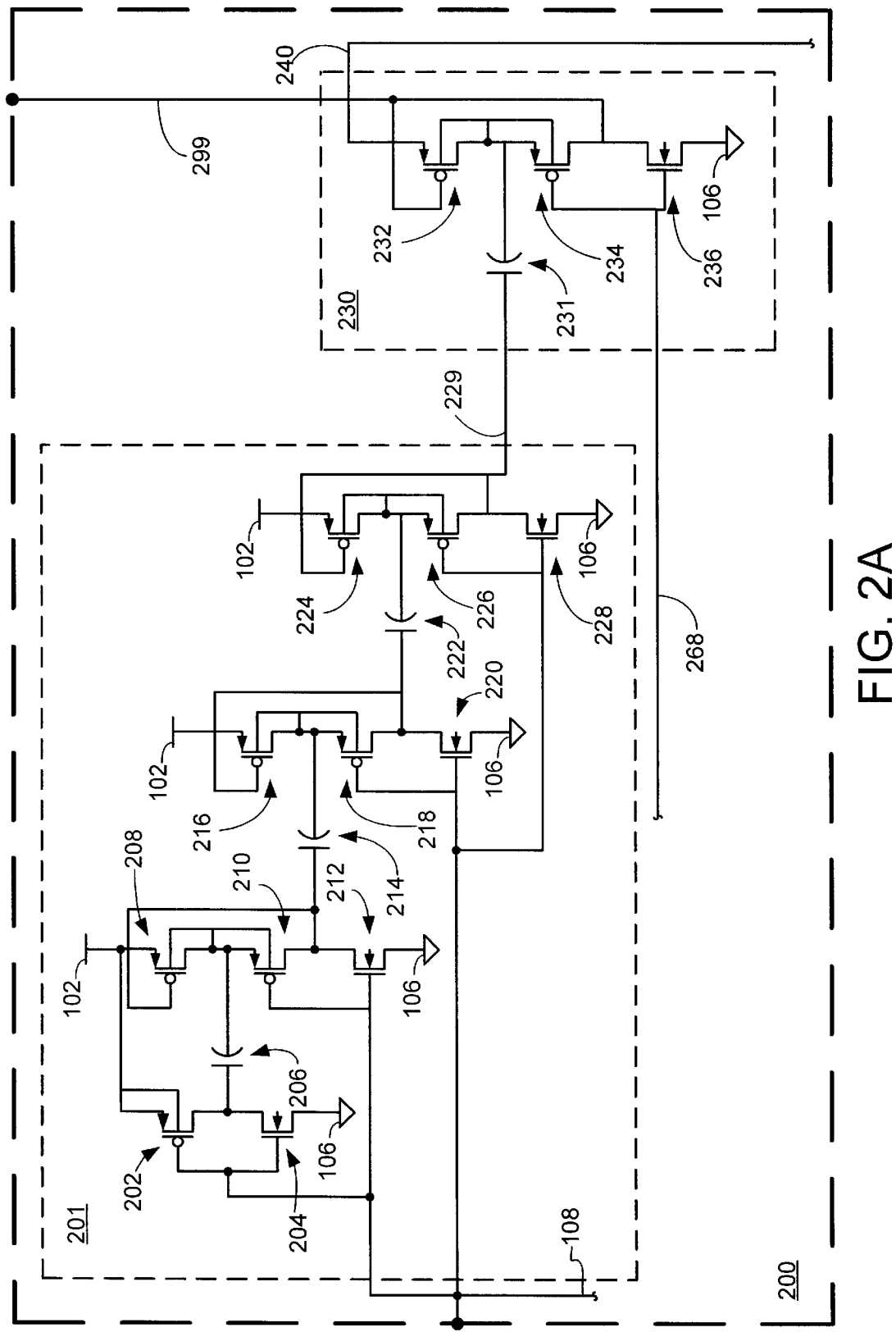
FIGS. 2A and 2B are transistor level schematics of the variable-amplitude clock signal generation circuitry of the present invention.
Figure 2B:
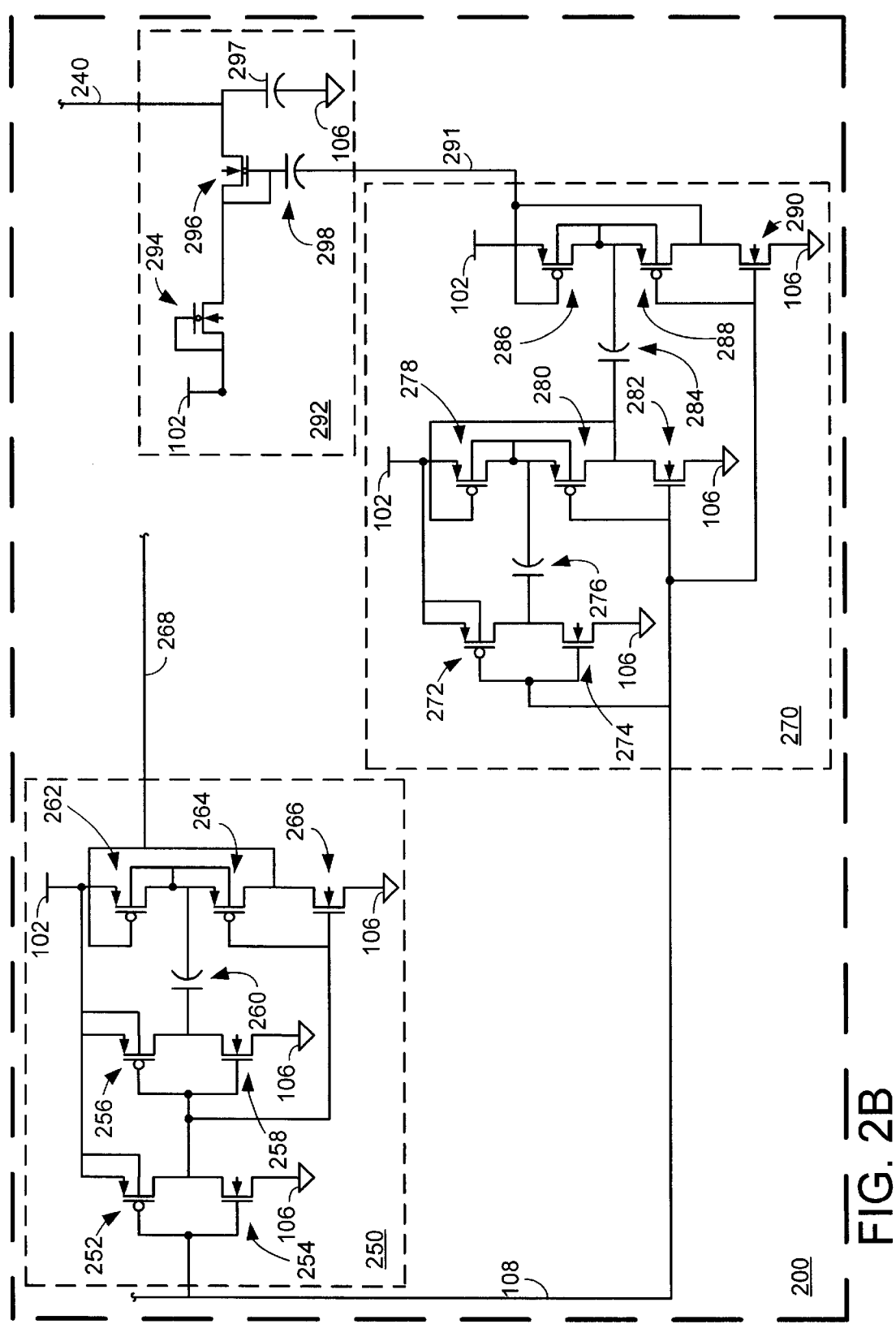

Referring now to FIGS. 2A and 2B, therein are shown transistor level schematics of the first pump clock block 200, one of the two sets of variable-amplitude clock signal generation circuitry in the present invention. FIGS. 2A and 2B show the first pump clock block 200 labeled with numbers in the range of 200 through 299. The second pump clock block 300 and the second pump clock output 399 shown in the block diagram in FIG. 1 are identical in structure to the first pump clock block 200 and have all the corresponding parts.

The first pump clock block 200 is split between the two diagrams for space considerations. Shown in FIG. 2A are a first bootstrapping circuitry block 201 and a summing circuitry block 230. FIG. 2B contains diagrams of the opposite phase generator block 250, a second bootstrapping circuitry block 270, and an intermediate charge pump block 292.

The first bootstrapping circuitry block 201 uses the power supply voltage Vdd 102 and ground 106 with the clock 108 as an input. The first bootstrapping circuitry block 201 can have any number of stages and is shown with three stages, the output of each carrying an increasing multiple of the original power supply voltage Vdd 102.

The first stage includes a PMOS transistor 202 and an NMOS transistor 204 that are connected to form a CMOS inverter. The input to the CMOS inverter is also the input to the first bootstrapping circuitry block 201, the clock 108. It is connected to the gates of the PMOS transistor 202 and the NMOS transistor 204. The drain of the PMOS transistor 202 and the drain of the NMOS transistor 204 are connected to each other, and also to left plate of a capacitor C3 206. It will be noted that the nomenclature "left plate" and "right plate" are used as a matter of convenience with reference to FIGS. 2A and 2B, and are not intended to be limiting. The source of the PMOS transistor 202 is connected to the power supply voltage Vdd 102, and the source of the NMOS transistor 204 is connected to ground 106.

An NMOS transistor 212 and PMOS transistors 208 and 210 are connected together in conjunction with the CMOS inverter and capacitor C3 206 to form a bootstrapping stage, which takes an input voltage and ideally doubles it at the output. The clock 108 is connected to the gates of the PMOS transistor 210 and the NMOS transistor 212. The drain of the PMOS transistor 210 and the drain of the NMOS transistor 212 are connected to each other, the left plate of a capacitor C4 214, and the gate of the PMOS transistor 208. The connection between the left plate of the capacitor C4 214 and the gate of the PMOS transistor 208 is a feedback loop. The source of the PMOS transistor 210 and the drain of the PMOS transistor 208 are connected together, to the right plate of the capacitor C3 206, and to the bodies of the PMOS transistors 208 and 210. The source of the PMOS transistor 208 is connected to the power supply voltage Vdd 102 and the source of the NMOS transistor 212 is connected to ground 106.

In operation with reference to the first bootstrapping circuitry block 201 of FIG. 2A, the first stage changes the input voltage from 0V to twice the power supply voltage Vdd 102 and can be used to charge a load capacitance or a subsequent stage. When the input of the first stage, the clock 108, is high, the NMOS transistors 204 and 212 are both conducting because their gates are connected to the high potential and the PMOS transistors 202, and 210 are not conducting due to the same high gate voltage. The output of the stage, the common connection between the PMOS transistor 210 and the NMOS transistor 212, is then connected to ground 106 through the conducting NMOS transistor 212. Because the output of the stage is at a low voltage and is connected to the gate of the PMOS transistor 208, the PMOS transistor 208 is conducting. A path for the capacitor C3 206 is then created from the power supply voltage Vdd 102 to ground 106 is created through the conducting PMOS transistor 208 and NMOS transistor 204, connecting the capacitor C3 206 to the power supply voltage Vdd 102 When the clock 108 transitions from the high value of the power supply voltage Vdd 102 to ground 106, the NMOS transistors 204 and 212 turn "off" and the PMOS transistors 202 and 210 turn "on". When the PMOS transistor 202 turns "on", there is a direct path through the PMOS transistor 202 to the power supply voltage Vdd 102, causing the left plate of the capacitor C3 206 to change from its initial voltage of 0V at ground 106 to the power supply voltage Vdd 102. At the same time, the NMOS transistor 212 turns "off", breaking the connection between ground 106 and the output, and the PMOS transistor 210 is if turned "on", causing the right plate of the capacitor C3 206 to be connected to the output. The change in voltage at the output is twice the supply voltage Vdd 102, or the sum of the change in voltage on the left-hand plate of the capacitor C3 206 plus voltage to which the capacitor C3 206 had previously been charged.

The bootstrapping technique used to double the voltage used in the first stage can be cascaded wherein a plurality of stages are added with the final output being n+1 times the power supply voltage Vdd 102 where n is equal to the number of bootstrap stages. In the first bootstrapping circuitry block 201 of FIG. 2A, there are a total of three stages producing a final output voltage of four times the power supply voltage Vdd 102.

The second bootstrapping stage includes the capacitor C4 214, an NMOS transistor 220 and two PMOS transistors 216 and 218. These transistors are connected in the same manner as the transistors in the first stage of the bootstrapping circuit with the clock 108 connected to the gates of the PMOS transistor 218 and the NMOS transistor 220. The drain of the PMOS transistor 218 and the drain of the NMOS transistor 220 are connected to each other, the left plate of a capacitor C5 222, and the gate of the PMOS transistor 216. The connection between the left plate of the capacitor C5 222 and the gate of the PMOS transistor 216 forms a feedback loop. The source of the PMOS transistor 218 and the drain of the PMOS transistor 216 are connected together, to the right plate of the capacitor C4 214, and to the bodies of the PMOS transistors 216 and 218. The source of the PMOS transistor 216 is connected to the power supply voltage Vdd 102 and the source of the NMOS transistor 220 is connected to ground 106. The second stage output formed by the connected drains of the PMOS transistor 218 and the NMOS transistor 220 outputs a voltage three times that of the original power supply voltage Vdd 102.

The cascaded stages, including the second bootstrapping stage, operate on the same principle as the first stage. Instead of the clock 108 and a CMOS inverter, the output of the prior bootstrapping circuit serves as an input. In the case of the second bootstrapping stage, when the clock 108 is high with the value of the power supply voltage Vdd 102, both the NMOS transistor 212 from the previous stage and the NMOS transistor 220 are conducting, providing direct pathways from the left plates of the capacitors C4 214 and C5 222 to ground 106. The output of the second stage is at a logical low level as a result and the PMOS transistor 216 is "on" and conducting due to its feedback loop. This causes the capacitor C4 214 to be charged to the power supply voltage Vdd 102. When the clock 108 transitions from a high value of the power supply voltage Vdd 102 to a low value of ground 106, the NMOS transistor 220 turns "off" and the PMOS transistor 218 turns "on" at the same time that the NMOS transistor 212 turns "off" and the PMOS transistor 210 turns "on". The capacitors C3 206 and C4 214, each charged to a voltage equal to the power supply voltage Vdd 102, are thus connected in series to each other and to the power supply voltage Vdd 102. The falling edge of the clock input 108 thus produces a rising edge of three times the power supply voltage Vdd 102 on the output of the second stage.

The third bootstrapping stage includes an NMOS transistor 228 and two PMOS transistors 224 and 226. These transistors are connected in the same way as the transistors in the second stage of the bootstrapping circuit with the clock 108 connected to the gates of the PMOS transistor 226 and the NMOS transistor 228. The drain of the PMOS transistor 226 and the drain of the NMOS transistor 228 are connected to each other, the gate of the PMOS transistor 224, and act as the first bootstrapping circuitry block output 229. The connection between the first bootstrapping circuitry block output 229 and the gate of the PMOS transistor 224 forms a feedback loop. The source of the PMOS transistor 226 and the drain of the PMOS transistor 224 are connected together, to the right plate of the capacitor CS 222, and to the bodies of the PMOS transistors 224 and 226. The source of the PMOS transistor 224 is connected to the power supply voltage Vdd 102 and the source of the NMOS transistor 228 is connected to ground 106.

The third bootstrapping stage is a cascaded bootstrapping stage and as such is identical in operation to that of the second bootstrapping stage. Its output is four times that of the original power supply voltage Vdd 102. As would be evident to those skilled in the art, additional stages could be added or subtracted to obtain higher or lower voltages as required.

Referring now to FIG. 2B, therein is shown the opposite phase generator block 250 used to increase the voltage of the clock input to summing circuitry block 230. It consists of a first CMOS inverter and a single-stage bootstrapping circuit and produces an output that is twice the amplitude of the power supply voltage Vdd 102. The first inverter is composed of a PMOS transistor 252 in series with an NMOS transistor 254. The source of the PMOS transistor 252 is connected to the power supply voltage Vdd 102, the source of the NMOS transistor 254 is connected to ground 106, and the gates of both transistors are connected to the clock 108.

The bootstrapping portion of the opposite phase generator block 250 is composed of three PMOS transistors 256, 262, and 264, two NMOS transistors 258 and 266, and a capacitor C7 260. Two of the transistors are connected in series to form a second CMOS inverter identical to the first CMOS inverter. The source of the PMOS transistor 256 is connected to the power supply voltage Vdd 102 and the source of the NMOS transistor 258 connected to ground 260. The gates of both transistors are connected to the inverted clock signal that is created by output of the first inverter. The drain of the NMOS transistor 258 and the drain of the PMOS transistor 256 are connected and form an output of the second inverter. This output is connected to the left plate of the capacitor C7 260.

The remaining transistors are connected in series. The PMOS transistor 262 is connected to the power supply voltage Vdd 102 at its source and has its drain connected to the source of the PMOS transistor 264. The drain of the PMOS transistor 264 is connected to the drain of the NMOS transistor 266, which in turn has its source connected to ground 106. The gates of the PMOS transistor 264 and the NMOS transistor 266 are connected to the inverted clock signal at the output of the first CMOS transistor. An opposite phase generator block output 268 is produced at the junction of the NMOS transistor 266 and the PMOS transistor 264 and connects as a feedback loop to the gate of the PMOS transistor 262. The bodies of both the PMOS transistors are connected to the source-drain junction of the two PMOS transistors 262 and 264.

In operation, the bootstrapping portion of the opposite phase generator block 250 operates identically to the first bootstrapping stage described in FIG. 2A. One exception is that the phase of the signal used as a clock by the bootstrapping circuit is inverted in phase from the original clock 108 due to the first CMOS inverter. Because the opposite phase generator block 250 only contains a single bootstrapping stage, the result is the opposite phase generator block output 268 has twice the amplitude of the power supply voltage Vdd 102 and is in phase with the primary clock 108.

Referring still to FIG. 2B, therein is shown the second bootstrapping circuitry block 270. It is identical to the first bootstrapping circuitry block 201 except that it has only two stages instead of three, thus resulting in an output voltage three times the power supply voltage Vdd 102 instead of four. Like the first bootstrapping circuitry block 201, it uses the power supply voltage Vdd 102 and ground 106 and uses the clock 108 as an input. While this best mode contains two bootstrapping stages, the present invention can have any number of stages with the output of each carrying an increasing multiple of the original power supply voltage Vdd 102.

The first stage includes a PMOS transistor 272 and an NMOS transistor 274 that are connected to form a CMOS inverter. The input to the CMOS inverter is also the input to the second bootstrapping circuitry block 270, the clock 108. It is connected to the gates of the PMOS transistor 272 and the NMOS transistor 274. The drain of the PMOS transistor 272 and the drain of the NMOS transistor 274 are connected to each other, and also to left plate of a capacitor C8 276. The source of the PMOS transistor 272 is connected to the power supply voltage Vdd 102, and the source of the NMOS transistor 274 is connected to ground 106.

An NMOS transistor 282 and PMOS transistors 278 and 280 are connected together in conjunction with the CMOS inverter and capacitor C8 276 to form a bootstrapping stage which takes an input voltage and doubles it at the output. The clock 108 is connected to the gates of the PMOS transistor 280 and the NMOS transistor 282. The drain of the PMOS transistor 280 and the drain of the NMOS transistor 282 are connected to each other, the left plate of a capacitor C9 284, and the gate of the PMOS transistor 278. The connection between the PMOS transistor 280 and the NMOS transistor 282 and the gate of the PMOS transistor 278 forms a feedback loop. The source of the PMOS transistor 280 and the drain of the PMOS transistor 278 are connected together, to the right plate of the capacitor C8 276, and to the bodies of the PMOS transistors 278 and 280. The source of the PMOS transistor 278 is connected to the power supply voltage Vdd 102 and the source of the NMOS transistor 282 is connected to ground 106.

In operation, the first stage of the second bootstrapping circuitry block 270 operates identically to the description of the operation of the first stage of the first bootstrapping circuitry block 201 in FIG. 2A, resulting in a first stage output that is two times the power supply voltage Vdd 102.

The second bootstrapping stage includes the capacitor C9 284, an NMOS transistor 290 and two PMOS transistors 286 and 288. These transistors are connected in the same manner as the transistors in the first stage of the bootstrapping circuit with the clock 108 connected to the gates of the PMOS transistor 288 and the NMOS transistor 290. The drain of the PMOS transistor 288 and the drain of the NMOS transistor 290 are connected to each other and the gate of the PMOS transistor 286, and acts as the second bootstrapping circuitry block output 291. The connection between the second bootstrapping circuitry block output 291 and the gate of the PMOS transistor 286 forms a feedback loop. The source of the PMOS transistor 288 and the drain of the PMOS transistor 286 are connected together, to the right plate of the capacitor C9 284, and to the bodies of the PMOS transistors 286 and 288. The source of the PMOS transistor 286 is connected to the power supply voltage Vdd 102 and the source of the NMOS transistor 290 is connected to ground 106. The second bootstrapping circuitry block output 291 provides a voltage three times that of the original power supply voltage Vdd 102.

In operation, the second stage of the second bootstrapping circuitry block 270 operates identically to the description of the operation of the second stage of the first bootstrapping circuitry block 201 in FIG. 2A, resulting in a first stage output that is three times the power supply voltage Vdd 102.

Referring still further to FIG. 2B, therein is shown the intermediate charge pump block 292. The intermediate charge pump block 292 is connected to the power supply voltage Vdd 102, takes in an input signal, and provides a low impedance version. Because the cascaded capacitors of the second bootstrapping circuitry block 270 do not provide a low impedance power supply, running the signal through the intermediate charge pump block 292 has the result of creating a low impedance signal of equal amplitude to the second bootstrapping circuitry block output 291.

The intermediate charge pump block 292 is a single-stage charge pump and includes two native transistors 294 and 296. A typical transistor has a switching threshold voltage, which is set by the doping of its channel. A transistor that has not undergone the channel doping process is termed a "native transistor" and has a lower threshold voltage because it must rely on the intrinsic background or body of the transistor to set the threshold voltage. The typical native transistor threshold voltage can range from 0.1V to 0.3V but the effective threshold voltage can be almost doubled due to the body effect.

Each of the native transistors in the intermediate charge pump block 292 is configured as a diode with the drain connected to the gate. In this configuration, current can only be delivered from the drain to the source. The transistor is biased "on" when the source has a lower voltage than the drain and the transistor is biased "off" when the source has a higher voltage than the drain.

Both the gate and the drain of the native transistor 294 are connected to the power supply voltage Vdd 102. The source of the native transistor 294 is connected to both the gate and the drain of the native transistor 296. Also connected to the gate of the native transistor 296 is a capacitor C10 298. The capacitor CIO 298 serves as the input to the intermediate charge pump block 292 and is connected to the second bootstrapping circuitry block output 291. The source of the native transistor 296 is connected to ground 106 through a load capacitor C11 297. The source of the native transistor 296 serves as the output of the intermediate charge pump block 240.

In operation, the intermediate charge pump block 292 takes in the second bootstrapping block output 291 as an input and outputs the intermediate pump clock output 240. The native transistor 294 is connected to the power supply voltage Vdd 102 so is "on" and conducting when the source voltage is greater than the power supply voltage Vdd 102 and is "off", with the capacitor C10 298 charging, when it is less than the source voltage. As a result, when the input of the intermediate charge pump block 292, the second bootstrapping circuitry block output 291, is high, the intermediate pump clock output 240 is low. At this time, the charge pump is charging. When the input of the intermediate charge pump block 292 is low, the intermediate pump clock output 240 is a low impedance version of the second bootstrapping circuitry block output 291, which is three times the power supply voltage Vdd 102.

Referring back now to the summing circuitry block 230 in FIG. 2A, therein is a circuit identical in structure to a bootstrapping stage in the first bootstrapping circuitry block 201 with similar operation. The primary difference is that the input signals come from other circuit blocks instead of the power supply voltage Vdd 102 and the clock 108.

Like the bootstrapping stages, the summing circuitry block 230 has a capacitor C6 231, an NMOS transistor 236, and two PMOS transistors 232 and 234. Instead of being connected to the clock 108 as in other bootstrapping stages, the PMOS transistor 234 and the NMOS transistor 236 are connected to the opposite phase generator block output 268, shown in FIG. 2B. The drain of the PMOS transistor 234 and the drain of the NMOS transistor 236 are connected to each other, the gate of the PMOS transistor 232, and to output of the summing circuitry block. The output of the summing circuitry block 230 is the first pump clock output 299. The connection between the first pump clock output 299 and the gate of the PMOS transistor 232 forms a feedback loop. The source of the PMOS transistor 234 and the drain of the PMOS transistor 232 are connected together, to the right plate of the capacitor C6 231, and to the bodies of the PMOS transistors 232 and 234. The left plate of the capacitor C6 231 is the input of the summing circuitry block 230 and is connected to the first bootstrapping circuitry block output 229. Instead of the power supply voltage Vdd 102 like other bootstrapping circuits, the source of the PMOS transistor 232 is connected to an intermediate pump block output 240 shown in FIG. 2B. The source of the NMOS transistor 236 is connected to ground 106.

In the previous bootstrapping stages, the output has equaled the sum of the input voltage and the power supply voltage Vdd 102. In the summing circuitry block 230, the input voltage is the first bootstrapping circuitry block output 229 and the power supply voltage has been replaced by the intermediate pump block output 240 shown in FIG. 2B. Because of this, the first pump clock output 299 is equal to the sum of the voltages of the intermediate pump block output 240, which is three times the power supply voltage Vdd 102, and the first bootstrapping circuitry block output 229, which is four times the power supply voltage Vdd 102. The resulting voltage at the first pump clock output 299 is seven times the power supply voltage Vdd 102.

Figure 3:
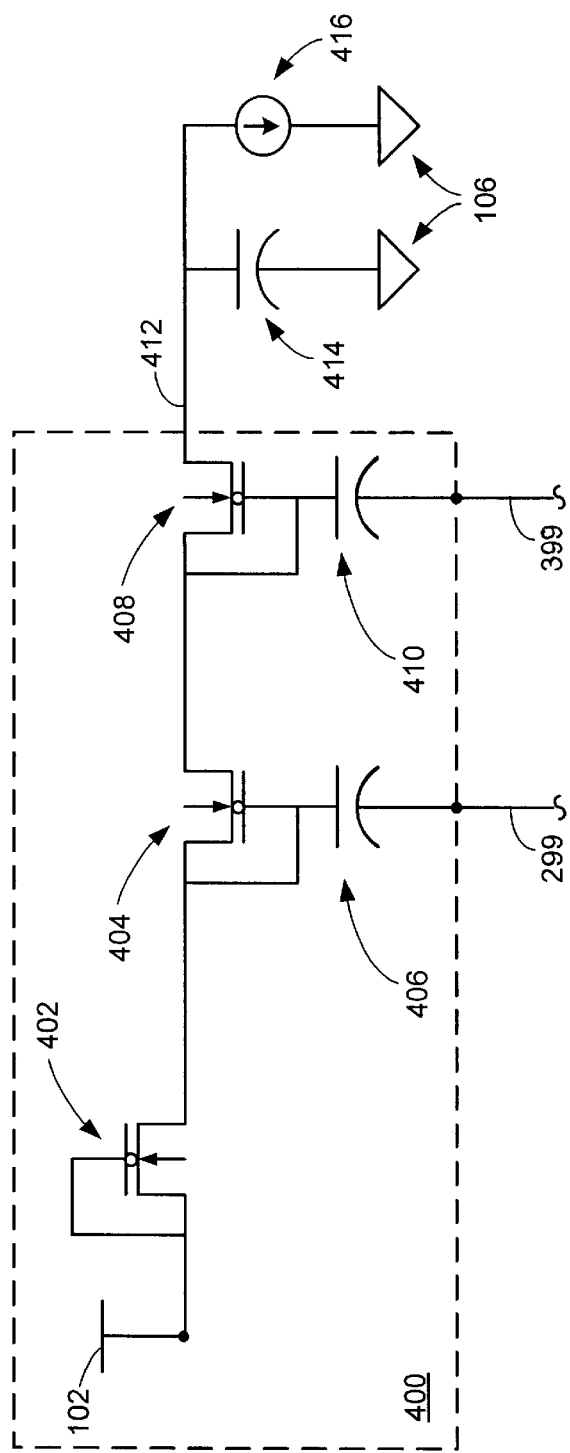
FIG. 3 is a transistor-level diagram of the charge pump block and its connections with the associated variable-amplitude clock signal generation circuitry of the present invention.

Referring now to FIG. 3, therein is shown a transistor-level diagram of the primary charge pump block 400 and its connections with the associated variable-amplitude clock signal generation circuitry of the present invention. A typical charge pump shifts a charge along a series of diode-connected native transistors until the desired end voltage is reached. In this case, the high-voltage pump clock signals allow the desired end voltage to be reached in two stages.

The primary charge pump block 400 consists of two coupling capacitors CC1 406 and CC2 410, the load capacitor CL1 414, the current load 416, and three diode-connected native transistors 402, 404, and 408. As previously explained, diode-connected transistors have their drain connected to their gate. In this configuration, current can only be delivered from the drain to the source. The transistor is biased "on" when the source has a lower voltage than the drain and the transistor is biased "off" when the source has a higher voltage than the drain.

Both the gate and the drain of the native transistor 402 are connected to the power supply voltage Vdd 102. The source of the native transistor 402 is connected to both the gate and the drain of the native transistor 404. Also connected to the gate of the native transistor 404 is the capacitor CC1 406. The capacitor CC1 406 is in turn connected to the first pump clock output 299. The source of the native transistor 404 is connected to the drain and gate of the native transistor 408. Also connected to the gate of the native transistor 408 is the capacitor CC2 410. The capacitor CC2 410 is in turn connected to the second pump clock output 399. The source of the native transistor 408 is a primary charge pump output 412 and is shown connected to the load capacitor CL1 414 and the current load 416 in order to simulate a generic load on the charge pump system 100. Both the load capacitor CL1 414 and the current load 416 are connected to ground 106.

In operation, the primary charge pump block 400 shifts a charge through two charge pump stages. Each charge pump stage is composed of a capacitor-coupled native transistor controlled by a pump clock. Because the two pump clocks are opposite in phase, one stage is charging the coupling capacitor while the other stage is conducting charge. When a pump clock is high, the associated native transistor is turned "on", building up the charge along the capacitor. The pump clock voltages must be larger than the power supply voltage Vdd 102 in order for the pumping action to occur, and because the voltages of the first and second pump clock outputs 299 and 399 are so high, the charge built up due to the pumping action in the circuit is extremely fast. When a pump clock is low, the charge is passed onto the next stage in the case of the native transistor 404, or, in the case of the native transistor 408, passed to the primary charge pump output 412 as the desired high voltage level. The power supply voltage Vdd 102 is isolated from the charge pump stages by the diode-connected native transistor 402.

Figure 4:
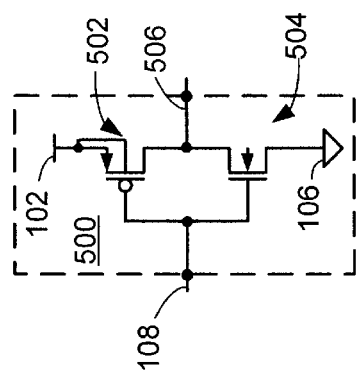
FIG. 4 is a transistor-level diagram of the inverter block of the present invention.

Referring now to FIG. 4, therein is shown the inverter block 500 of the present invention. The inverter block is a simple CMOS inverter including a PMOS transistor 502 and an NMOS transistor 504 connected in series. The source of the PMOS transistor 502 is connected to the power supply voltage Vdd 102, the source of the NMOS transistor 504 is connected to ground 106, and the drain of the PMOS transistor 502 and the drain of the NMOS transistor 504 are connected together. The gates of the PMOS transistor 502 and the NMOS transistor 504 are connected to the clock 108. The source-drain junction forms the inverter block output 506.

In operation, the inverter block 500 takes the clock 108 as an input and outputs an inverted clock signal through the inverter block output 506. When the clock 108 is high, the NMOS transistor 504 is "on" and the PMOS transistor 502 is "off". The result is a connection from the inverter block output 506 to ground 106 through the conducting NMOS transistor 504. When the clock 108 is low, the NMOS transistor 504 is "off" and the PMOS transistor 502 is "on". The result is a connection from the inverter block output 506 to the power supply voltage Vdd 102 through the conducting PMOS transistor 502.

The transistors in FIGS. 2A and B, FIG. 3, and FIG. 4 include NMOS or N-type conductivity transistors that conduct with a logical high gate voltage as well as PMOS or P-type conductivity transistors that conduct with a logical low gate voltage. In creating a PMOS transistor, the "body" or substrate of the transistor is made of an n-type material and is assumed to be connected to the power supply voltage Vdd 102 unless otherwise stated. By Similarly, an NMOS transistor has a body made of a p-type material and is assumed to be connected to ground 106 unless otherwise stated. "CMOS" devices, which stand for Complementary Metal Oxide Semiconductor devices, refer to circuits that use both PMOS and NMOS transistors.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the spirit and scope of the included claims, including the usage of a generic voltage input signal instead of the specific case of a power supply voltage. All matters hither-to-fore set forth herein or shown in the accompanying drawings are to be interpreted in an illustrative and non-limiting sense.

The invention claimed is:

1. A circuit comprising:
    a charge pump circuit operable to receive an input voltage and a first clock signal, wherein the charge pump circuit is operable to generate a voltage greater than the input voltage; and
    a first pump clock circuit coupled to the charge pump circuit, the first pump clock circuit operable to receive a second clock signal having an amplitude that is approximately equal to an amplitude of the input voltage and the first pump clock circuit operable to increase the amplitude of the second clock signal to an amplitude that is greater than twice an amplitude of the input voltage within an initial single half clock cycle of the second clock signal to generate the first clock signal.

2. The circuit of claim 1 wherein the first clock signal has an amplitude that is approximately an integer multiple of the amplitude of the input voltage.

3. The circuit of claim 1 wherein the input voltage is less than 2 volts.

4. The circuit of claim 1 wherein the input voltage is equal to a supply voltage.

5. A circuit comprising a charge pump circuit coupled to receive an input voltage and coupled to receive a first clock signal having an amplitude that is greater than twice an amplitude of the input voltage, wherein the charge pump circuit uses the first clock signal to generate an output voltage that is greater than the input voltage.

6. The circuit of claim 5 wherein the first clock signal has an amplitude that is approximately an integer multiple of the amplitude of the input voltage.

7. The circuit of claim 5 further comprising a first pump clock circuit coupled to the charge pump circuit, the first pump clock circuit operable to generate the first clock signal.

8. The circuit of claim 5 further comprising a first pump clock circuit operable to receive a second clock signal having an amplitude that is approximately equal to the amplitude of the input voltage and operable to increase the amplitude of the second clock signal to generate the first clock signal.

9. The circuit of claim 5 further comprising a first pump clock circuit having multiple bootstrapping stages, the multiple bootstrapping stages operable to receive a second clock signal having an amplitude that is approximately equal to the amplitude of the input voltage and operable to increase the amplitude of the second clock signal in a half clock cycle of the second clock signal to generate the first clock signal.

10. The circuit of claim 5 wherein the input voltage is less than 2 volts.

11. The circuit of claim 5 wherein the input voltage is equal to a supply voltage.

12. A method comprising:
    receiving an input voltage at a charge pump circuit;
    receiving a first clock signal at the charge pump circuit, wherein the first clock signal has an amplitude that is greater than twice an amplitude of the input voltage;
    generating an output voltage using the first clock signal, wherein the output voltage is greater than the input voltage;
    and receiving a second clock signal at a pump clock circuit, the pump clock circuit being operable to increase the amplitude of the second clock signal to an amplitude that is greater than twice an amplitude of the input voltage within an initial single half clock cycle of the second clock signal to generate the first clock signal.

13. The method of claim 12 wherein the input voltage is less than 2 volts.

14. The method of claim 12 wherein the input voltage is equal to a supply voltage.

* * * * *